US012560695B2

(12) United States Patent
Zhang et al.

(10) Patent No.:  US 12,560,695 B2
(45) Date of Patent:  Feb. 24, 2026

(54) RADAR SYSTEM TO JOINTLY DETECT DIRECTION-OF-ARRIVAL AND DIRECTION-OF-DEPARTURE ANGLES IN MULTIPATH SCENARIOS

(71) Applicant: Aptiv Technologies AG, Schaffhausen (CH)

(72) Inventors: Yu Zhang, Thousand Oaks, CA (US); Zhengzheng Li, Agoura Hills, CA (US); Xin Zhang, Agoura Hills, CA (US); Yujie Gu, Calabasas, CA (US)

(73) Assignee: Aptiv Technologies AG, Schaffhausen (CH)

( * ) Notice: Subject to any disclaimer, the term of this patent is extended or adjusted under 35 U.S.C. 154(b) by 388 days.

(21) Appl. No.: 18/155,722

(22) Filed: Jan. 17, 2023

(65) Prior Publication Data

US 2024/0241243 A1     Jul. 18, 2024

(51) Int. Cl.
| | |
|---|---|
| *G01S 13/42* | (2006.01) |
| *G01S 7/03* | (2006.01) |
| *G01S 13/931* | (2020.01) |

(52) U.S. Cl.
CPC ................ *G01S 13/42* (2013.01); *G01S 7/03* (2013.01); *G01S 13/931* (2013.01)

(58) Field of Classification Search
CPC .......... G01S 13/42; G01S 7/03; G01S 13/931; G01S 3/28; G01S 13/08; G01S 13/46;
(Continued)

(56) References Cited

U.S. PATENT DOCUMENTS

| | | | |
|---|---|---|---|
| 5,657,027 | A | 8/1997 | Guymon |
| 7,474,262 | B2 | 1/2009 | Alland |

(Continued)

FOREIGN PATENT DOCUMENTS

| | | |
|---|---|---|
| CN | 106772224 A | 5/2017 |
| CN | 111239678 A | 6/2020 |

(Continued)

OTHER PUBLICATIONS

H. Jiang, J.-K. Zhang and K. M. Wong, "Joint DOD and DOA Estimation for Bistatic MIMO Radar in Unknown Correlated Noise," in IEEE Transactions on Vehicular Technology, vol. 64, No. 11, pp. 5113-5125, Nov. 2015, doi: 10.1109/TVT.2014.2384495 (Year: 2015).*

(Continued)

*Primary Examiner* — Vladimir Magloire
*Assistant Examiner* — Yonghong Li
(74) *Attorney, Agent, or Firm* — Harness, Dickey & Pierce, P.L.C.

(57) ABSTRACT

This document describes techniques and systems to enable a radar system to jointly detect DoA and DoD angles in multipath scenarios. In some examples, an automotive radar system includes one or more processors. The processors obtain electromagnetic (EM) energy reflected by objects and generate, based on the reflected EM energy, a two-dimensional (2D) data matrix. The 2D data matrix has a number of rows corresponding to the number of antenna elements in a transmitter array and a number of columns corresponding to the number of antenna elements in a receiver array. Using the 2D data matrix, the processors can determine DoA estimates and DoD estimates in both monostatic and bistatic reflection scenarios. By comparing the DoA estimates to the DoD estimates, the processors determine angles associated (Continued)

with the objects with improved angular resolution and reduced cost.

19 Claims, 7 Drawing Sheets

(58) Field of Classification Search
CPC .... G01S 13/58; G01S 13/72; G01S 2013/462; G01S 2013/464
See application file for complete search history.

(56) References Cited

U.S. PATENT DOCUMENTS

| | | | |
|---|---|---|---|
| 7,639,171 B2 | 12/2009 | Alland et al. | |
| 9,395,727 B1 | 7/2016 | Smith et al. | |
| 9,869,762 B1 | 1/2018 | Alland et al. | |
| 10,416,680 B2 | 9/2019 | Li et al. | |
| 10,446,923 B2 | 10/2019 | Watson | |
| 10,809,737 B2 | 10/2020 | Li et al. | |
| 10,866,304 B1 | 12/2020 | Hassibi et al. | |
| 11,460,567 B2 * | 10/2022 | Amani | G01S 13/872 |
| 11,619,705 B2 | 4/2023 | Zhang et al. | |
| 11,635,506 B2 | 4/2023 | Iwasa et al. | |
| 2017/0029107 A1 * | 2/2017 | Emami | G01S 13/582 |
| 2017/0149147 A1 | 5/2017 | Minami et al. | |
| 2018/0149736 A1 | 5/2018 | Alland et al. | |
| 2019/0285738 A1 | 9/2019 | Iwasa et al. | |
| 2019/0324133 A1 | 10/2019 | Hong et al. | |
| 2020/0004262 A1 | 1/2020 | Li et al. | |
| 2020/0256947 A1 | 8/2020 | Motoda | |
| 2020/0292690 A1 | 9/2020 | Kim et al. | |
| 2020/0309899 A1 | 10/2020 | Jonas et al. | |
| 2020/0355816 A1 | 11/2020 | Ishikawa | |
| 2021/0373144 A1 | 12/2021 | Amani et al. | |
| 2022/0163623 A1 | 5/2022 | Kishigami et al. | |
| 2022/0214425 A1 * | 7/2022 | Yoffe | G01S 13/584 |
| 2022/0236370 A1 | 7/2022 | Li et al. | |

FOREIGN PATENT DOCUMENTS

| | | | |
|---|---|---|---|
| EP | 2662699 A1 | 11/2013 | |
| EP | 3757607 A1 | 12/2020 | |
| EP | 4036600 A1 | 8/2022 | |
| EP | 4043919 A1 | 8/2022 | |
| JP | 6523350 B2 | 5/2019 | |
| JP | 2020186972 A | 11/2020 | |
| WO | 2021096889 A1 | 5/2021 | |

OTHER PUBLICATIONS

F. Muhammad and H. Li, "Localization of mobile transmitting devices in non Line-of-Sight (NLOS) multipath environments using MIMO radar technology," 2014 IEEE Symposium on Wireless Technology and Applications (ISWTA), Kota Kinabalu, Malaysia, 2014, pp. 24-29, doi: 10.1109/ISWTA.2014.6981189 (Year: 2014).*
"Extended European Search Report", EP Application No. 22200994.6, Aug. 11, 2023, 15 pages.
"Extended European Search Report", EP Application No. 23158330.3, Aug. 25, 2023, 17 pages.
Wu, et al., "A Low Complexity Adaptive Algorithm for Eigenspace-Based Two-Dimensional Direction of Arrival Tracking", IEICE Transactions on Fundamentals of Electronics, Communications and Computer Sciences, vol. E92-A, No. 8, Aug. 1, 2019, pp. 2097-2106.
"Extended European Search Report", EP Application No. 23165460.9, Sep. 15, 2023, 16 pages.
"Extended European Search Report", EP Application No. 22197753.1, Mar. 7, 2023, 17 pages.
Zhang, et al., "Flexible Array Response Control via Oblique Projection", IEEE Transactions on Signal Processing, vol. 67, No. 12, Jun. 15, 2019, pp. 3126-3139.
"Extended European Search Report", EP Application No. 21196393.9, Feb. 28, 2022, 11 pages.
"Extended European Search Report", EP Application No. 21196394.7, Mar. 4, 2022, 11 pages.
"Extended European Search Report", EP Application No. 21215410.8, Jul. 12, 2022, 9 pages.
"Extended European Search Report", EP Application No. 21216318.2, May 30, 2022, 10 pages.
"Extended European Search Report", EP Application No. 21216322.4, Jun. 3, 2022, 9 pages.
Amin, et al., "Sparse Arrays and Sampling for Interference Mitigation and DOA Estimation in GNSS" Proceedings of the IEEE, vol. 104, No. 6, Jun. 2016, pp. 1302-1317.
Capon, "High-Resolution Frequency—Wavenumber Spectrum Analysis", Proceedings of the IEEE, vol. 57, No. 8, Aug. 1969, pp. 1408-1418.
Chan, et al., "A parameter estimation approach to estimation of frequencies of sinusoids", Apr. 1981, pp. 214-219, 6 pages.
Chen, et al., "A new method for joint DOD and DOA estimation in bistatic MIMO radar", Feb. 2010, pp. 714-718.
Engels, et al., "Automotive MIMO Radar Angle Estimation in the Presence of Multipath", Oct. 2017, 5 pages.
Feger, et al., "A 77-GHz FMCW MIMO Radar Based on an SiGe Single-Chip Transceiver", IEEE Transactions on Microwave Theory and Techniques, vol. 57, No. 5, May 2009, pp. 1020-1035.
Gu, et al., "Adaptive Beamforming via Sparsity-Based Reconstruction of Covariance Matrix", Compressed Sensing in Radar Signal Processing, 2019, 33 pages.
Gu, et al., "Joint SVD of Two Cross-Correlation Matrices to Achieve Automatic Pairing in 2-D Angle Estimation Problems", IEEE Antennas and Wireless Propagation Letters, vol. 6, pp. 553-556, Feb. 2007, 4 pages.
Gu, et al., "Robust Adaptive Beamforming Based on Interference Covariance Matrix Reconstruction and Steering Vector Estimation", IEEE Transactions on Signal Processing, vol. 60, No. 7, Jul. 2012, pp. 3881-3885.
Gu, et al., "Robust Adaptive Beamforming Based on Interference Covariance Matrix Sparse Reconstruction", Signal Processing, vol. 96, Mar. 1, 2014, pp. 375-381.
Haardt, et al., "Unitary ESPRIT: How to Obtain Increased Estimation Accuracy with a Reduced Computational Burden", May 1995, 1232-1242.
Jiang, et al., "Joint DOD and DOA Estimation for Bistatic MIMO Radar in Unknown Correlated Noise", Nov. 2015, pp. 5113-5125.
Jin, et al. "Joint DOD and DOA estimation for bistatic MIMO radar", Feb. 2009, pp. 244-251.
Kikuchi, et al., "Pair-Matching Method for Estimating 2-D Angle of Arrival With a Cross-Correlation Matrix", IEEE Antennas and Wireless Propagation Letters, vol. 5, pp. 35-40, Mar. 2006, 6 pages.
Mcglaning, "Multipath Propagation", Wireless Receiver Design for Digital Communications—Chapter 3., Jan. 2012, pp. 190-206.
Moffet, "Minimum-Redundancy Linear Arrays", IEEE Transactions on Antennas and Propagation, vol. AP-16, No. 2., Mar. 1968, pp. 172-175.
Pursuant to MPEP § 2001.6(b) the applicant brings the following co-pending application to the Examiner's attention: U.S. Appl. No. 17/075,632.
Qian, et al., "Enhanced PUMA for direction-of-arrival estimation and its performance analysis", Aug. 15, 2016, pp. 4127-4137, 11 pages.
Razavi-Ghods, "Characterisation of MIMO Radio Propagation Channels", Durham theses, Durham University. Available at Durham E-Theses Online: http://etheses.dur.ac.uk/2526/ (Year: 2007), 349 pages.
Roy, et al., "ESPRIT—Estimation of Signal Parameters Via Rotational Invariance Techniques", Jul. 1989, pp. 984-995.
Scheiner, et al., "Seeing Around Street Corners: Non-Line-of-Sight Detection and Tracking In-the-Wild Using Doppler Radar", Dec. 2019, pp. 2068-2077.
Schmidt, "Multiple Emitter Location and Signal Parameter Estimation", IEEE Transactions on Antennas and Propagation, Mar. 1986, pp. 276-280.

(56) References Cited

OTHER PUBLICATIONS

Shi, et al., "Sparsity-Based Two-Dimensional DOA Estimation for Coprime Array: From Sum-Difference Coarray Viewpoint", IEEE Transactions on Signal Processing, vol. 65, No. 21, Nov. 1, 2017, pp. 5591-5604.

Steinwandt, et al., "Performance Analysis of ESPRIT-Type Algorithms for Co-Array Structures", Dec. 10, 2017, 5 pages.

Sun, et al., "MIMO Radar for Advanced Driver-Assistance Systems and Autonomous Driving: Advantages and challenges", Jul. 2020, pp. 98-117.

Tropp, et al., "Signal Recovery From Random Measurements Via Orthogonal Matching Pursuit", IEEE Transactions on Information Theory, vol. 53, No. 12, Dec. 2007, pp. 4655-4666, Dec. 2007, 12 pages.

Vaidyanathan, et al., "Sparse Sensing with Co-Prime Samplers and Arrays", IEEE Trans. Signal Process., vol. 59, No. 2, Feb. 2011, pp. 573-586.

Vaidyanathan, et al., "Theory of Sparse Coprime Sensing in Multiple Dimensions", IEEE Transactions on Signal Processing, vol. 59, No. 8, Aug. 2011, pp. 3592-3608.

Van Trees, "Planar Arrays and Apertures", Essay in "Detection, Estimation, and Modulation Theory, Optimum Array Processing", pp. 231-274. Wiley-Interscience, May 2002, 44 pages.

Visentin, et al., "Analysis of Multipath and DOA Detection Using a Fully Polarimetric Automotive Radar", Apr. 2018, 8 pages.

Wang, et al., "Two-Dimensional Beamforming Automotive Radar with Orthogonal Linear Arrays", 2019 IEEE Radar Conference, Boston, MA, Apr. 22-26, 2019., 6 pages.

Yu, et al., "MIMO Adaptive Beamforming for Nonseparable Multipath Clutter Mitigation", IEEE Transactions on Aerospace and Electronic Systems, vol. 50, No. 4, Oct. 2014, pp. 2604-2618.

Zhou, et al., "A Robust and Efficient Algorithm for Coprime Array Adaptive Beamforming", IEEE Transactions on Vehicular Technology, vol. 67, No. 2, Feb. 2018, pp. 1099-1112.

Zoltowski, et al., "Closed-Form 2-D Angle Estimation with Rectangular Arrays in Element Space or Beamspace via Unitary ESPRIT", Feb. 1996, pp. 316-328.

Zoltowski, et al., "ESPRIT-Based 2-D Direction Finding with a Sparse Uniform Array of Electromagnetic Vector Sensors", Aug. 1, 2000, pp. 2195-2204.

* cited by examiner

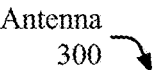
Antenna
300
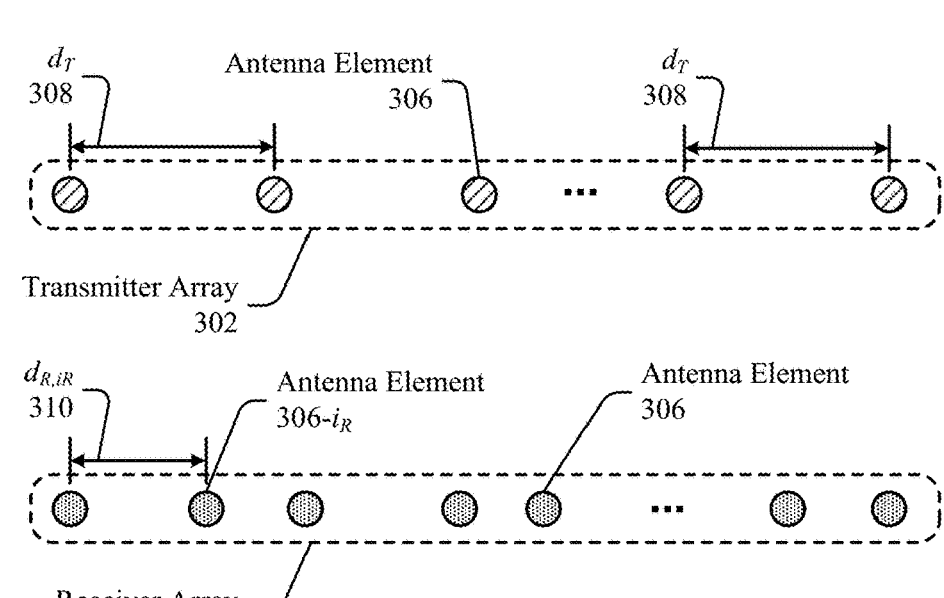
$d_T$
308
Antenna Element
306
$d_T$
308
Transmitter Array
302
$d_{R,iR}$
310
Antenna Element
306-$i_R$
Antenna Element
306
Receiver Array
304
*FIG. 3*
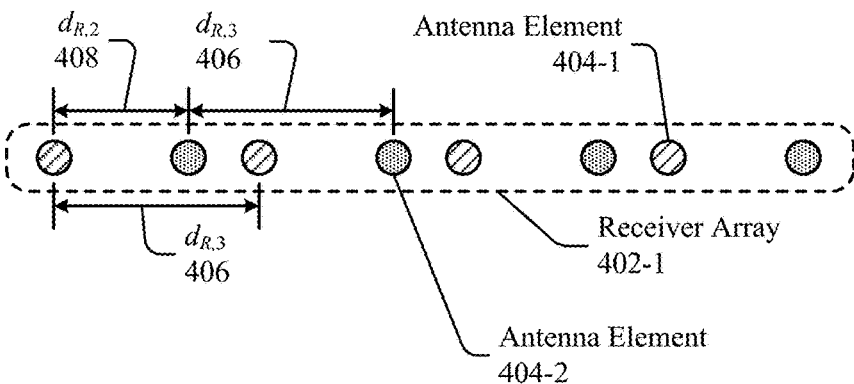
$d_{R,2}$
408
$d_{R,3}$
406
Antenna Element
404-1
$d_{R,3}$
406
Receiver Array
402-1
Antenna Element
404-2
*FIG. 4-1*

500

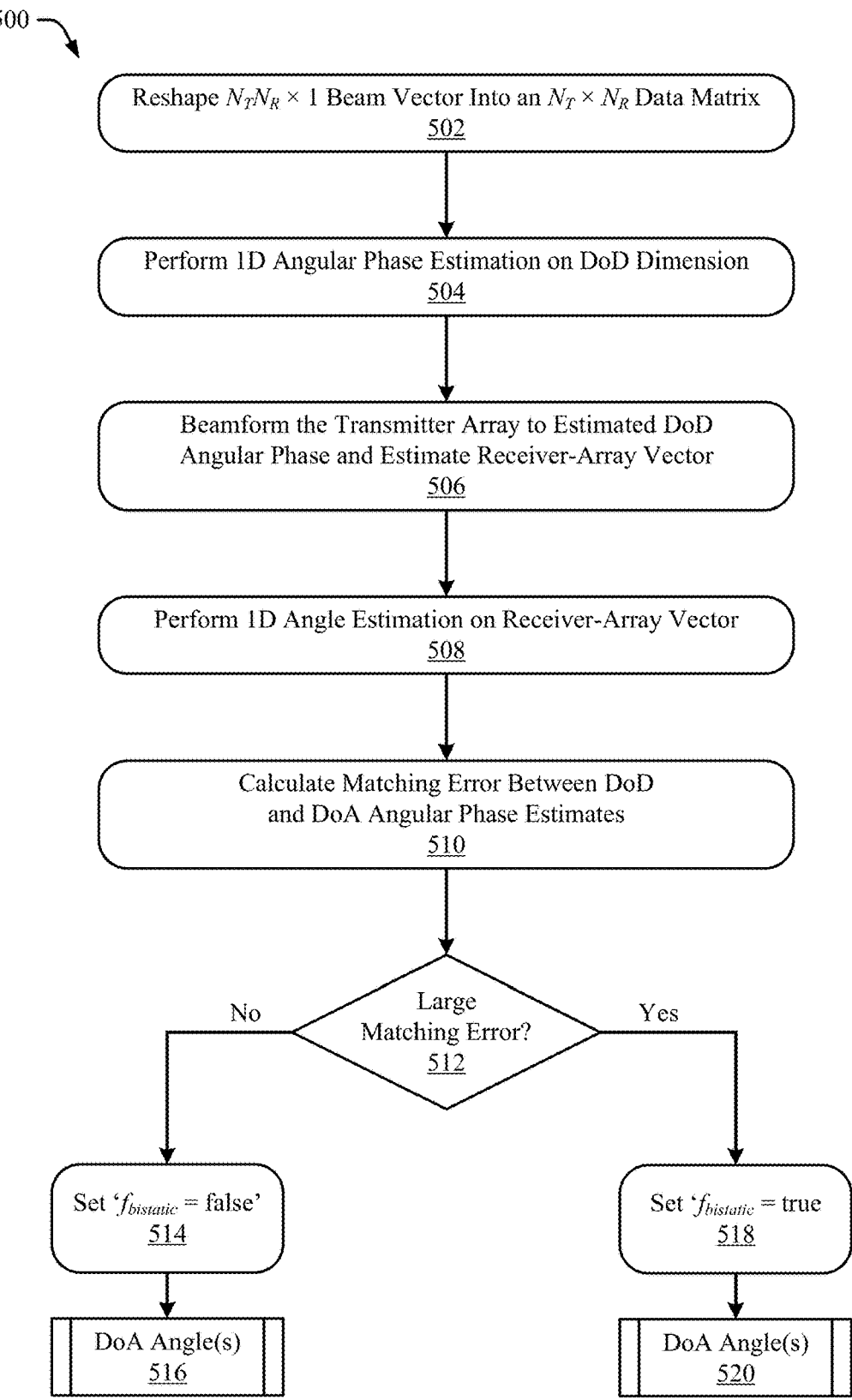

Reshape $N_T N_R \times 1$ Beam Vector Into an $N_T \times N_R$ Data Matrix
502

Perform 1D Angular Phase Estimation on DoD Dimension
504

Beamform the Transmitter Array to Estimated DoD
Angular Phase and Estimate Receiver-Array Vector
506

Perform 1D Angle Estimation on Receiver-Array Vector
508

Calculate Matching Error Between DoD
and DoA Angular Phase Estimates
510

Large
Matching Error?
512

No

Yes

Set '$f_{bistatic}$ = false'
514

Set '$f_{bistatic}$ = true
518

DoA Angle(s)
516

DoA Angle(s)
520

*FIG. 5*

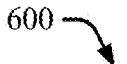
$FIG. 6$

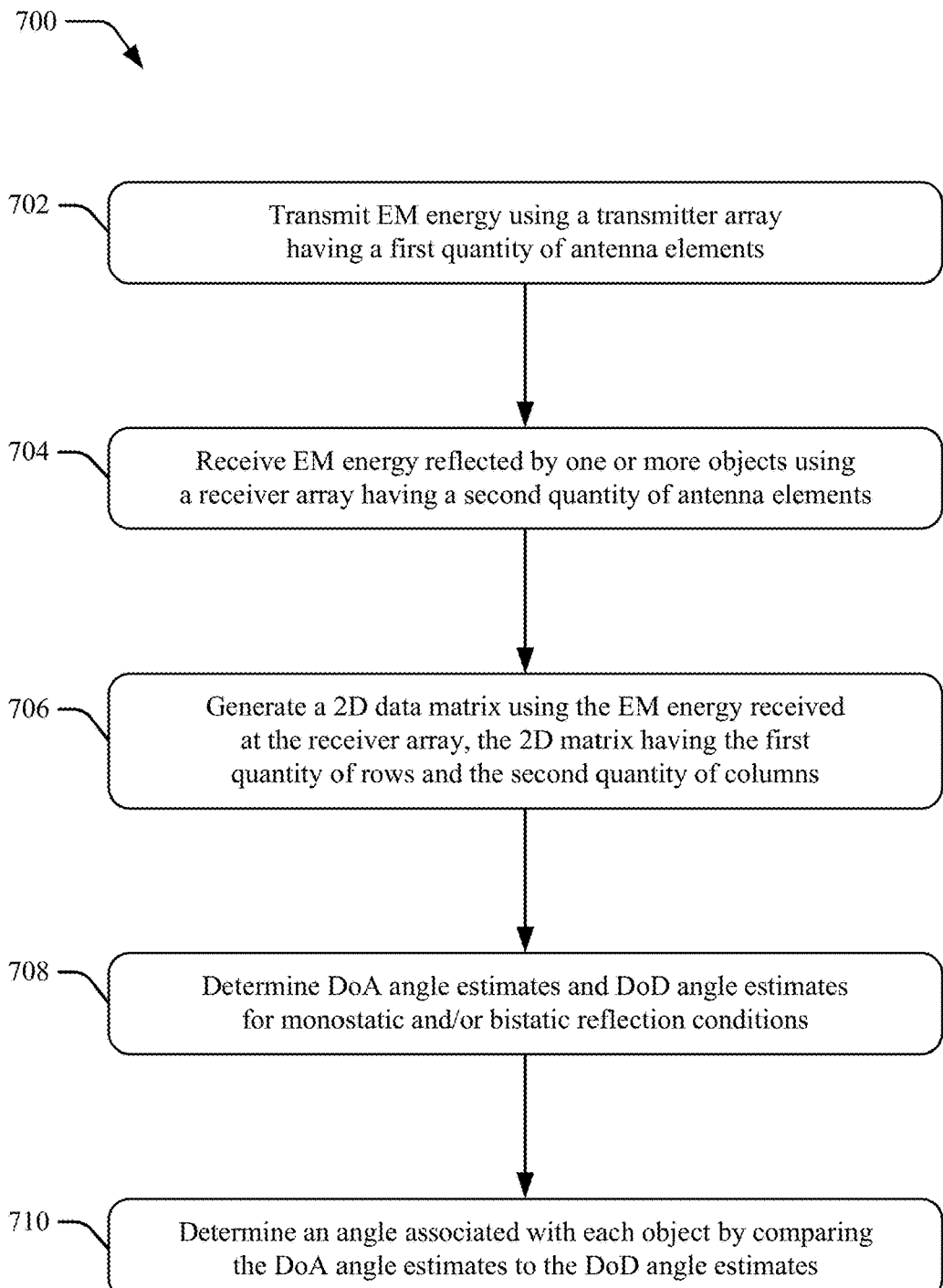

700

702 — Transmit EM energy using a transmitter array having a first quantity of antenna elements 704 — Receive EM energy reflected by one or more objects using a receiver array having a second quantity of antenna elements 706 — Generate a 2D data matrix using the EM energy received at the receiver array, the 2D matrix having the first quantity of rows and the second quantity of columns 708 — Determine DoA angle estimates and DoD angle estimates for monostatic and/or bistatic reflection conditions 710 — Determine an angle associated with each object by comparing the DoA angle estimates to the DoD angle estimates

*FIG. 7*

RADAR SYSTEM TO JOINTLY DETECT DIRECTION-OF-ARRIVAL AND DIRECTION-OF-DEPARTURE ANGLES IN MULTIPATH SCENARIOS

BACKGROUND

Radar systems use antennas to transmit and receive electromagnetic (EM) signals for detecting and tracking objects. In automotive applications, radar systems operate in dynamic environments that can cause EM signals to have multipath reflections. A multipath reflection can occur when an EM signal encounters a reflective surface (e.g., a wall, barrier, fence, guardrail, semi-truck, automobile); a multipath reflection may cause the direction of departure (DoD) for a transmitted EM signal to differ from the direction of arrival (DoA) for a corresponding reflected EM signal. If the DoD is not equal to the DoA, a multiple-input and multiple-output (MIMO) radar system generally cannot generate a synthetic array, which provides the radar system with a virtual array that has a larger aperture than a corresponding physical array.

SUMMARY

This document describes techniques and systems to enable a radar system to jointly detect DoA and DoD angles in multipath scenarios. In some examples, a radar system for installation on a vehicle includes at least one processor. The processor is configured to obtain EM energy reflected by one or more objects in an environment of the vehicle, and generate, based on the reflected EM energy, a two-dimensional (2D) data matrix. The 2D data matrix has a number of rows corresponding to the number of antenna elements in a transmitter array and a number of columns corresponding to the number of antenna elements in a receiver array. Using the 2D data matrix, the processor can determine DoA estimates and DoD estimates for multipath scenarios. By comparing the DoA estimates to the DoD estimates, the processor can determine an angle associated with each object. In this way, the described techniques and systems can enable a radar system to detect angles associated with objects in multipath scenarios with a virtual array providing improved angular resolution and reduced cost.

This document also describes methods performed by the above-summarized system and other configurations of the radar system set forth herein and means for performing these methods.

This Summary introduces simplified concepts related to enabling a radar system to jointly detect DoA and DoD angles in multipath scenarios, and are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a radar system to jointly detect DoA and DoD angles in multipath scenarios are described in this document with reference to the following figures. The same numbers are often used throughout the drawings to reference like features and components:

FIG. 3 illustrates an example antenna with a physical array of antenna elements for a radar system that can jointly detect DoA and DoD angles in multipath scenarios;

FIGS. 4-1 through 4-4 illustrate example receiver arrays of antenna elements for a radar system that can jointly detect DoA and DoD angles in multipath scenarios;

FIG. 5 illustrates an example flowchart of the described techniques and systems for jointly detecting DoA and DoD angles in multipath scenarios;

FIG. 6 illustrates an example 2D data matrix generated by the described radar system to jointly detect DoA and DoD angles in multipath scenarios; and FIG. 7 illustrates an example method of a radar system to jointly detect DoA and DoD angles in multipath scenarios.

DETAILED DESCRIPTION

Overview

Figure 1:
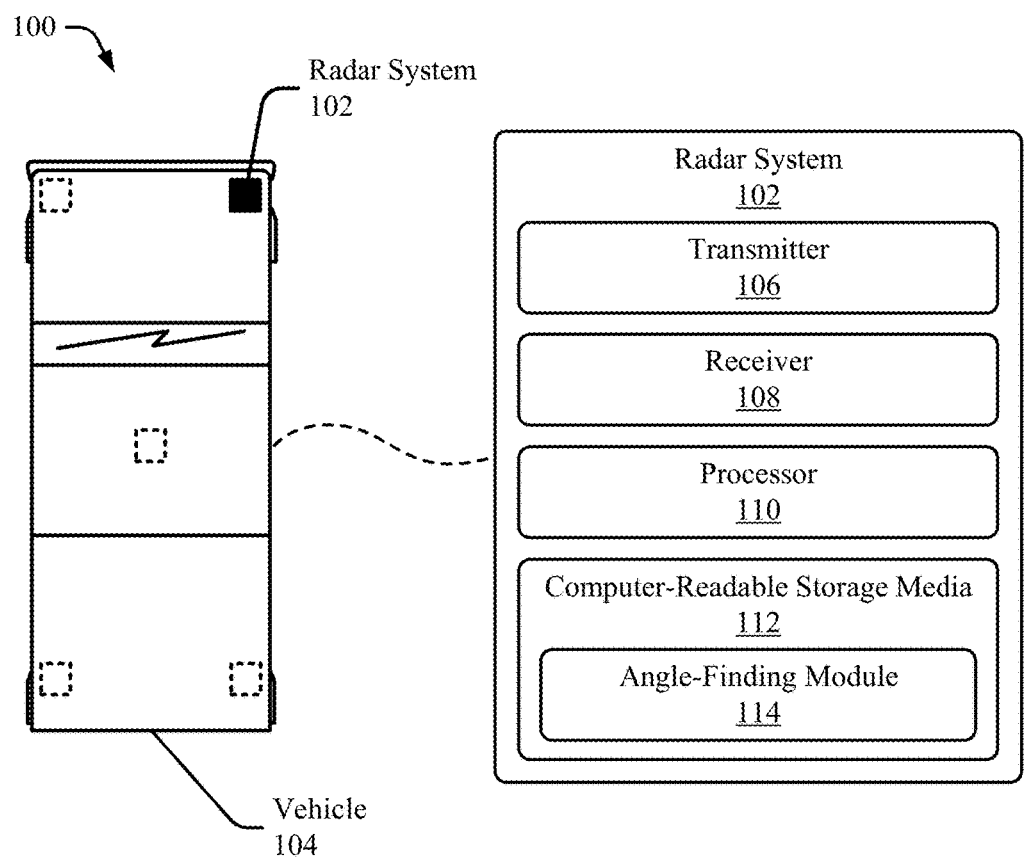
FIG. 1 illustrates an example environment in which a radar system can jointly detect DoA and DoD angles in multipath scenarios in accordance with techniques of this disclosure.
Figure 1:
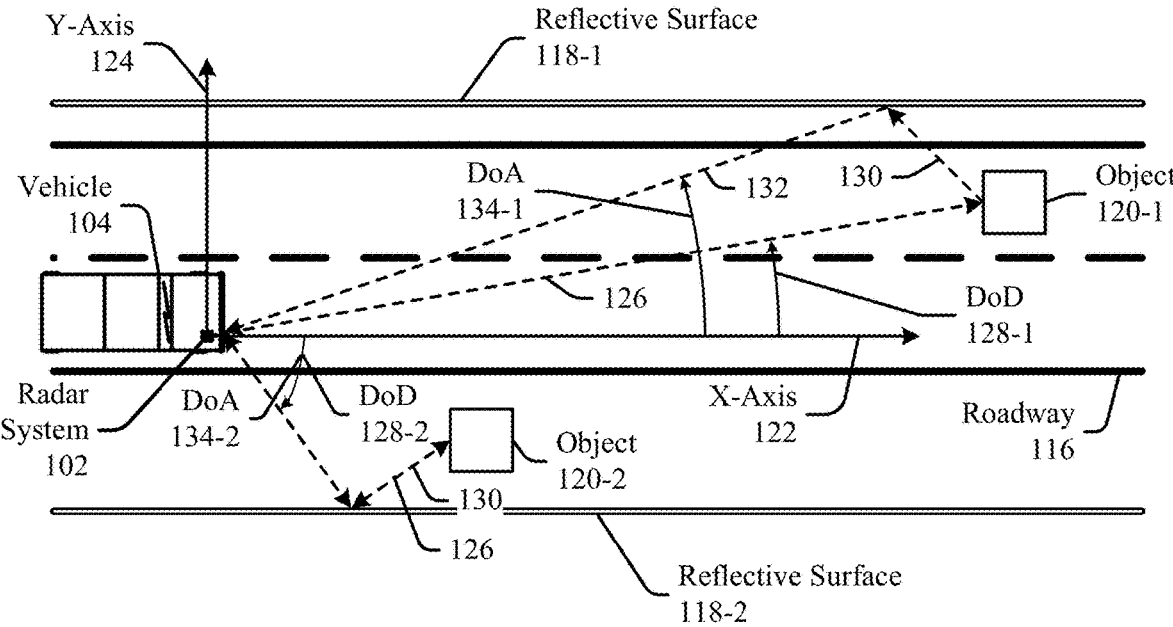

Radar systems can be configured as an important sensing technology that vehicle-based systems use to acquire information about the surrounding environment. For example, vehicle-based systems can use radar systems to detect objects in or near a roadway and, if necessary, take necessary actions (e.g., reduce speed, change lanes) to avoid a collision.

Radar systems generally include at least two antennas to transmit and receive EM radiation. Some automotive radar systems operate multiple-input and multiple-output (MIMO) radars in crowded environments to obtain reliable detections of nearby objects. Multipath reflections can occur when a reflective surface (e.g., a wall, fence, barrier, guardrail, another vehicle) reflects an EM signal. The multipath-reflection environment can result in several scenarios, including direct-path reflections, bistatic reflections, and two-way multipath reflections. A direct-path reflection, which is an example of a monostatic reflection scenario, occurs when a transmitted and reflected EM signal travels directly between the radar system and the object. A direct-path scenario provides the shortest distance between a radar system and an object.

In contrast, a bistatic reflection scenario occurs when a transmission takes a different trajectory or path to travel between a radar system and an object than the reflection takes, resulting in the DoD being different from the DoA. In contrast, a monostatic reflection scenario occurs when the DoD is the same as the DoA, regardless of whether the transmission and reflection paths take a direct-path or multipath trajectory.

In bistatic reflection scenarios, radar detections often cannot be used as reliable indicators, for example, to detect objects in a radar system field-of-view because a radar reflection has a DoA that is not equal to the DoD. The mismatch between the DoD and the DoA can violate a necessary condition for some MIMO radar systems to form a synthetic array. In other words, bistatic reflection scenarios can mask the position of the reflecting object, which makes determining the angle of nearby objects relative to the radar system difficult.

Automotive radar systems often use MIMO radar systems to improve angular resolution. In MIMO, the radar system and/or processor forms a synthetic array with a larger aperture than the corresponding physical arrays. For example, a radar system can configure eight physical channels of a radar transceiver (e.g., two transmit channels and six receive channels) using MIMO to provide twelve channels (or another number of channels) larger than the number of physical channels. With additional channels, a MIMO radar system can operate with an improved angular resolution, relying on a flexible physical layout of inexpensive and possibly fewer hardware components than traditional non-MIMO radar systems.

However, a radar system often cannot form a synthetic array using MIMO if the DoD is different from the DoA. If a bistatic reflection scenario exists, the DoD is not equal to the DoA. As a result, radar detections cannot easily be mapped to a corresponding antenna element of a synthetic array, resulting in errors using MIMO techniques to detect and track objects. The DoD-DoA mismatch can also lead to saturation or overconsumption of computing resources. At best, the saturation may merely delay a radar system output; at worst, the output includes errors from incorrectly mapping a surrounding environment, which can cause an automotive system or an operator of a vehicle to drive in an unsafe manner, for example, by driving too closely to objects that are not accurately tracked or operating the vehicle too gingerly by leaving an exaggerated buffer between the vehicle and the objects.

Some radar systems address bistatic reflection scenarios using polarimetric antennas, constrained spacing among antenna elements, and/or multiple data snapshots over a period of time. For example, some radar systems use polarimetric antennas to analyze bistatic reflection scenarios. Often, these systems can accurately distinguish monostatic reflection scenarios from bistatic reflection scenarios only if the target is known. These systems also rely on more-expensive polarimetric antennas. Other radar systems can only distinguish bistatic reflection scenarios from monostatic reflection scenarios using multiple data snapshots (e.g., more than one hundred snapshots) and an antenna spacing of half the transmitted wavelength (e.g., $0.5\lambda$) for both the transmitter and receiver array. Because automotive radar systems generate a single snapshot while a vehicle moves, such systems are generally inapplicable to automotive applications. These systems also require a relatively large number of antenna elements to satisfy the half-wavelength spacing.

In contrast, this document describes techniques and systems to provide a radar system to jointly detect DoA and DoD angles in multipath reflection scenarios, regardless of whether monostatic and/or bistatic reflection scenarios exist. For example, a radar system can include a transmitter array and a receiver array. The transmitter array includes a first number of antenna elements. The receiver array includes a second number of antenna elements. The antenna elements of the transmitter or receiver array can be uniformly spaced apart by a first distance. The antenna elements of the other one of the transmitter or receiver array are spaced apart to avoid angular ambiguity. The radar system can jointly determine DoA estimates and DoD estimates by generating a two-dimensional (2D) data matrix with the first number of rows and the second number of columns. Using the 2D data matrix, the processors can determine DoA estimates and DoD estimates in both monostatic and/or bistatic reflection scenarios. In this way, the described systems and techniques utilizes MIMO techniques to reduce the number of antenna elements while preserving the angular resolution that can otherwise be achieved using a synthetic array. The radar system can also be used in automotive radar applications as a low-cost and computationally efficient solution without aliasing and only requiring a single data snapshot.

This example is just one example of the described techniques and systems of a radar system that can jointly detect DoA and DoD angles in multipath reflection scenarios. This document describes other examples and implementations.

Operating Environment

FIG. 1 illustrates an example environment 100 in which a radar system 102 can jointly detect DoA and DoD angles in multipath scenarios in accordance with techniques of this disclosure. In the depicted environment 100, the radar system 102 is mounted to, or integrated within, a vehicle 104 traveling on a roadway 116. Within an instrumental field-of-view, the radar system 102 can detect one or more objects 120 (e.g., an object 120-1 and another object 120-2) near or surrounding the vehicle 104. The radar system 102 emits radar signals with a direction-of-departure (DoD) 128 (e.g., DoD 128-1 and DoD 128-2) and receives corresponding radar reflections with a direction-of-arrival (DoA) 134 (e.g., DoA 134-1 and DoA 134-2). The radar system 102 can detect the objects 120 in the vicinity of the vehicle 104.

Although illustrated as a passenger truck, the vehicle 104 can represent other types of motorized vehicles (e.g., a car, an automobile, a motorcycle, a bus, a tractor, a semi-trailer truck), non-motorized vehicles (e.g., a bicycle), railed vehicles (e.g., a train), watercraft (e.g., a boat), aircraft (e.g., an airplane), or spacecraft (e.g., satellite). In general, manufacturers can mount the radar system 102 to any moving platform, including moving machinery or robotic equipment.

In the depicted implementation, the radar system 102 is mounted on the front of the vehicle 104 and illuminates the objects 120. The radar system 102 can detect the objects 120 from any exterior surface of the vehicle 104. For example, vehicle manufacturers can integrate the radar system 102 into a bumper, side mirror, headlights, rear lights, or any other interior or exterior location from where the objects 120 require detection. In some cases, the vehicle 104 includes multiple radar systems 102, such as a first radar system 102 and a second radar system 102, that provide a larger instrumental field-of-view. In general, vehicle manufacturers can design the locations of the one or more radar systems 102 to provide a particular field-of-view that encompasses a region of interest. Example fields-of-view include a 360-degree field-of-view, one or more 180-degree fields-of-view, one or more 90-degree fields-of-view, and so forth, which can overlap or be combined into a field-of-view of a particular size.

The objects 120 are composed of one or more materials that reflect radar signals. Depending on the application, the objects 120 can represent targets of interest. In some cases, the objects 120 may be moving objects (e.g., other vehicles) or stationary objects (e.g., roadside signs, road barriers, debris).

The radar system 102 emits EM radiation by transmitting EM signals or waveforms via antenna elements. In the environment 100, the radar system 102 detects and tracks the objects 120-1 and 120-2 by transmitting and receiving one or more radar signals. For example, the radar system 102 can transmit EM signals between one hundred and four hundred gigahertz (GHz), between four and one hundred GHz, or between approximately seventy and eighty GHz.

The radar system 102 includes a transmitter 106 to transmit EM signals. The radar system 102 also includes a receiver 108 to receive reflected versions of the EM signals. The transmitter 106 includes one or more components, including an antenna or antenna elements, for emitting the EM signals. The receiver 108 includes one or more components, including an antenna or antenna elements, for detecting the reflected EM signals. The transmitter 106 and the receiver 108 can be incorporated together on the same integrated circuit (e.g., a transceiver integrated circuit) or separately on different integrated circuits. In other implementations, the radar system 102 does not include a separate antenna, but the transmitter 106 and the receiver 108 each include one or more antenna elements. The radar system 102 may operate as a MIMO radar system.

The radar system 102 also includes one or more processors 110 (e.g., an energy processing unit) and computer-readable storage media (CRM) 112. The processor 110 may be a microprocessor or a system-on-chip. The processor 110 executes instructions stored in the CRM 112. For example, the processor 110 processes EM energy received by the receiver 108 and determines, using an angle-finding module 114, a location of the objects 120 relative to the radar system 102. The processor 110 also detects various features (e.g., range, target angle, range rate, velocity) of the objects 120. The processor 110 may also generate radar data for at least one automotive system. For example, the processor 110 can control, based on processed EM energy from the receiver 108, an autonomous or semi-autonomous driving system of the vehicle 104.

The angle-finding module 114 obtains EM energy received by the receiver 108 and determines angles associated with the objects 120. The radar system 102 can implement the angle-finding module 114 as instructions in the CRM 112, hardware, software, or a combination thereof executed by the processor 110.

The radar system 102 can determine a distance to the objects 120 based on the time it takes for the respective EM signals to travel from the radar system 102 to the objects 120, and from the objects 120 back to the radar system 102. The radar system 102 also determines, using the angle-finding module 114, a location of the object 120-1 in terms of the direction of departure (DoD) 128-1 and the direction of arrival (DoA) 134-1 based on the direction of one or more large-amplitude echo signal received by the radar system 102. Similarly, the radar system 102 also determines, using the angle-finding module 114, a location of the object 120-2 in terms of the direction of departure (DoD) 128-2 and the direction of arrival (DoA) 134-2 based on the direction of one or more large-amplitude echo signal received by the radar system 102.

As an example environment, FIG. 1 illustrates the vehicle 104 traveling on the roadway 116. A reflective surface 118-1 is near or in the roadway 116 to the left of the vehicle 104. Another reflective surface 118-2 is near or in the roadway 116 to the right of the vehicle 104. The reflective surfaces 118 may be a wall, guardrail, fence, building, or another vehicle. The radar system 102 detects the objects 120 in front of the vehicle 104. The radar system 102 may define a sensor or vehicle coordinate system with an x-axis 122 (e.g., in a forward direction along the roadway 116) and a y-axis 124 (e.g., perpendicular to the x-axis 122 and along a surface of the roadway 116). The transmitter 106 can transmit EM signals 126 in front of the vehicle 104. The objects 120 reflect the transmitted EM signals 126.

For example, the object 120-1 reflects the transmitted EM signal 126 as a reflected EM signal 130. The reflected EM signal 130 can travel directly back to the radar system 102 or be reflected by the reflective surface 118 as a reflected EM signal 132. The reflected EM signal 132 is received by the receiver 108. The angle-finding module 114 locates the object 120-1 by jointly determining the DoD 128-1 and the DoA 134-1 associated with the EM signals. The DoD 128-1 and the DoA-1 134 represent a horizontal angle from the x-axis 122 to the object 120. For the object 120-1, the DoD 128-1 is not equal to the DoA 134-1 and a bistatic reflection scenario exists.

For the object 120-2, the transmitted EM signal 126 is reflected back to the radar system 102 along the same multipath reflection path so that the DoD 128-2 is approximately equal to the DoA 134-2. In this scenario, the transmitted EM signal 126 is reflected by the reflective surface 118-2 and then reflected by the object 120-2. The reflected EM signal 130 is then reflected by the reflective surface 118-2 before being received by the radar system 102. In this two-way multipath reflection, the DoD 128-2 is approximately equal to the DoA 134-2 and a monostatic reflection scenario exists.

The vehicle 104 can also include at least one automotive system (not illustrated in FIG. 1) that relies on data from the radar system 102, such as a driver-assistance system, an autonomous-driving system, or a semi-autonomous-driving system. The radar system 102 can include an interface to the automotive system that uses the radar data. For example, the processor 110 outputs, via the interface, a signal based on EM energy received by the receiver 108.

Generally, the automotive systems use radar data provided by the radar system 102 to perform a function. For example, the driver-assistance system can provide blind-spot monitoring and generate an alert that indicates a potential collision with the objects 120 that is detected by the radar system 102. The radar data from the radar system 102 indicates when it is safe or unsafe to change lanes in such an implementation. The autonomous-driving system may move the vehicle 104 to a particular location on the roadway 116 while avoiding collisions with the objects 120 detected by the radar system 102. The radar data provided by the radar system 102 may provide information about a distance to and the location of the objects 120 to enable the autonomous-driving system to perform emergency braking, perform a lane change, or adjust the speed of the vehicle 104.

Figure 2:
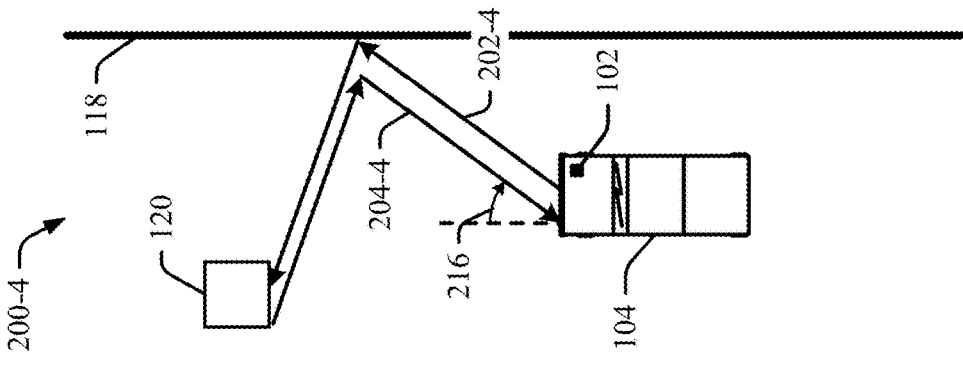
FIG. 2 illustrates different reflection conditions encountered by a vehicle with a radar system that can jointly detect DoA and DoD angles in multipath scenarios in accordance with techniques of this disclosure.
Figure 2:
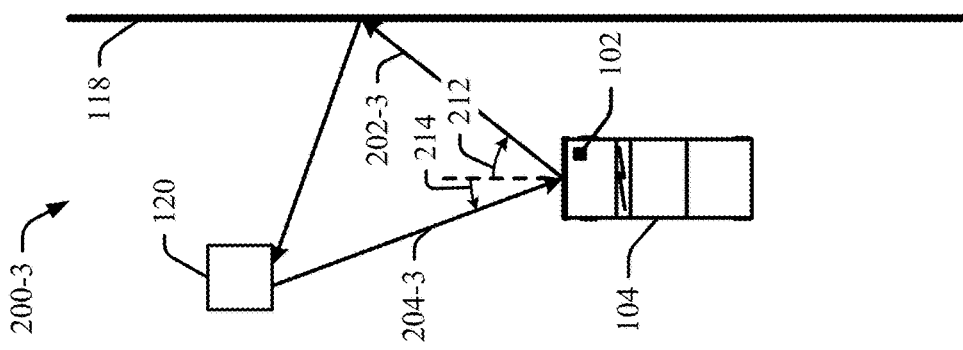
Figure 2:
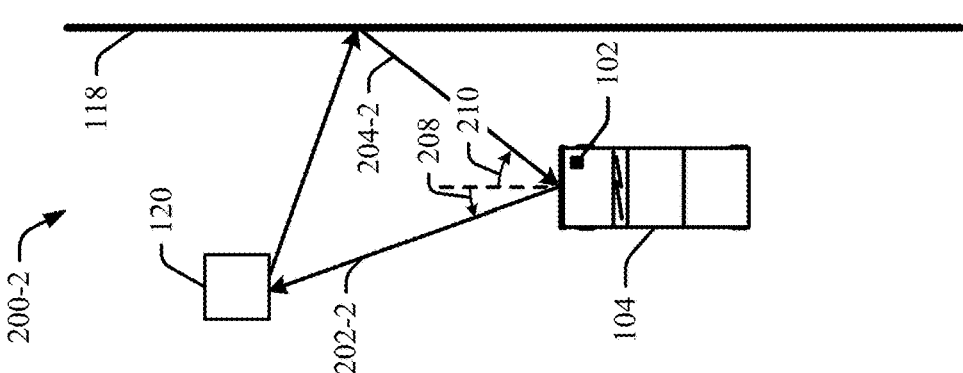
Figure 2:
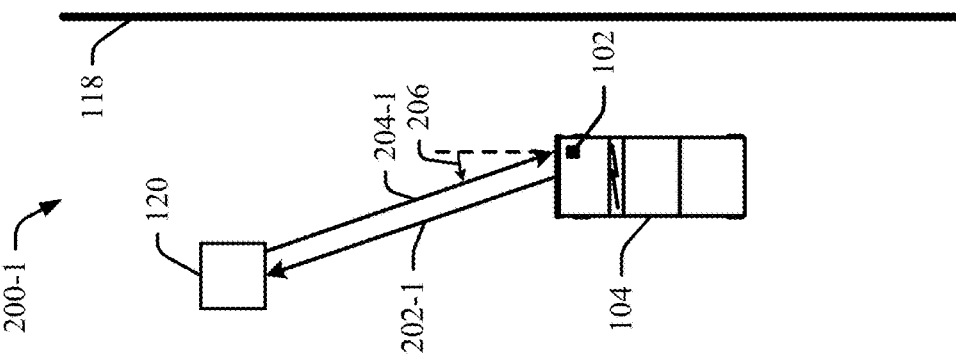

FIG. 2 illustrates different detection conditions 200-1, 200-2, 200-3, and 200-4 encountered by the vehicle 104 with the radar system 102 that can jointly detect DoA and DoD angles in multipath reflection scenarios in accordance with techniques of this disclosure. The one or more objects 120 can be at different positions relative to the vehicle 104. On the right side of vehicle 104, a reflective surface 118 (e.g., a guardrail, a railing, a construction zone boundary, a fence, another vehicle) exists. The radar system 102 detects the objects 120 by emitting a radar signal 202-1, 202-2, 202-3, or 202-4, and receiving a reflected radar signal 204-1, 204-2, 204-3, or 204-4, respectively.

In the detection condition 200-1, a monostatic reflection scenario exists for a direct-path transmission and a direct-path reflection of the EM signal. The radar system 102 transmits the radar signal 202-1 with a particular DoD angle. The corresponding reflected radar signal 204-1 is reflected by the object 120 to vehicle 104 with a particular DoA angle. The angle-finding module 114 determines that the DoA and the DoD angles are equal or approximately equal to an angle 206. Because the DoA and the DoD angles are equal or approximately equal, a bistatic reflection scenario does not exist in front of vehicle 104 with respect to the object 120. The transmission path or length of the transmitted radar signal 202-1 is equal to the transmission path or length of the reflected radar signal 204-1. The total path or length of the propagation path for the object 120 is also the shortest possible.

In the detection condition 200-2, a bistatic reflection scenario exists for a direct-path transmission and a multipath reflection. The radar system 102 transmits the radar signal 202-2 with a DoD equal to an angle 208. The corresponding reflected radar signal 204-2 is reflected by the object 120 and the reflective surface 118 to the vehicle 104 with a DoA equal to an angle 210. Because the angle 208 is not equal to or approximately equal to the angle 210, the angle-finding module 114 determines that the DoA and the DoD are not equal, and therefore, a bistatic reflection scenario exists in front of vehicle 104 with respect to the object 120. The transmission path or length of the transmitted radar signal 202-2 is not equal to the transmission path or length of the reflected radar signal 204-2.

In the detection condition 200-3, another bistatic reflection scenario exists for a multipath transmission and a direct-path reflection. The radar system 102 transmits the radar signal 202-3 with a DoD equal to angle 212 toward the reflective surface 118. The corresponding reflected radar signal 204-3 is reflected by the object 120 to vehicle 104 with a DoA equal to angle 214. The angle-finding module 114 determines that the DoA and the DoD are not equal or approximately equal, and therefore, a bistatic reflection scenario exists in front of vehicle 104 with respect to the object 120. The transmission path or length of the radar signal 202-3 is not equal to the transmission path or length of the reflected radar signal 204-3. The radar signals of the bistatic reflection scenarios in the detection conditions 200-2 and 200-3 travel the same paths but in opposite directions. The total transmission path or length of the propagation path is equal in both bistatic reflection scenarios. The total transmission path for the detection conditions 200-2 and 200-3 are longer than the transmission path for the detection condition 200-1 but smaller than that for the detection condition 200-4.

In the detection condition 200-4, a monostatic reflection scenario exists for a multipath transmission and a multipath reflection. The radar system 102 transmits the radar signal 202-4 with a DoD equal to angle 216 toward the reflective surface 118. The corresponding reflected return radar signal 204-4 is reflected by the object 120 and the reflective surface 118 to the vehicle 104 with a DoA equal to the angle 216. The angle-finding module 114 determines that the DoA and the DoD are equal, and therefore, a bistatic reflection scenario does not exist in front of vehicle 104 with respect to the object 120. The transmission path or length of the radar signal 202-4 is equal to the transmission path or length of the reflected radar signal 204-4. The total transmission path or length of the propagation path is the longest possible among the detection conditions 200-1 through 200-4.

The described radar system 102 and angle-finding module 114 can perform object detection for one or more objects 120 in the detection conditions 200-1 through 200-4. Doppler velocity estimates for a multipath reflection can depend on the speed of the vehicle 104 (e.g., the host vehicle), the speed of the object 120, and the speed of the reflective surface 118. For example, when the reflective surface 118 is stationary (e.g., a wall, a fence, a guardrail), the direct-path detection condition 200-1 has the largest absolute Doppler velocity, while the two-way multipath detection condition 200-4 has the smallest absolute Doppler velocity. The bistatic reflection scenarios in the detection conditions 200-2 and 200-3 have the same Doppler velocity with an absolute value between those of the detection conditions 200-1 and 200-4. As another example, if the reflective surface 118 moves (e.g., a moving vehicle), Doppler velocity estimates for the detection conditions 200-2 and 200-3 are the same.

The angle-finding module 114 can find multiple clusters of energy in range-Doppler detections (RDDs), including direct-path detection conditions, bistatic reflection scenarios, and two-way multipath detection conditions. The angle-finding module 114 can use range-Doppler information to differentiate the bistatic reflection scenarios (e.g., detection conditions 200-2 and 200-3) from the monostatic reflection scenarios (e.g., detection conditions 200-1 and 200-4). However, the techniques described herein can jointly determine DoA and DoD angles associated with each object without needing to differentiate bistatic reflection scenarios from monostatic reflection scenarios.

After range-Doppler processing, the angle-finding module 114 can resolve the various reflection scenarios by considering multiple angular targets in the same range-Doppler bin. First, a monostatic reflection scenario exists where the DoD and the DoA are equal. In this scenario, the angle-finding module 114 can estimate the DoA without aliasing by forming a large synthetic array. Second, a bistatic reflection scenario exists where the DoD and the DoA are not equal. In this reflection scenario, the angle-finding module 114 can estimate the DoD and the DoA without aliasing. As an example, in the detection condition 200-2, the DoD is the angle 208, $\theta_1$, and the DoA is the angle 210, $\varphi_1$. For the detection condition 200-3, the DoD is the angle 212, $\theta_2$, and the DoA is the angle 214, $\varphi_2$. Because the propagation paths are the same, the angle 208, $\theta_1$, is equal or approximately equal to the angle 214, $\varphi_2$, and the angle 210, $\varphi_1$, is equal or approximately equal to the angle 212, $\theta_2$.

Figures 2, 4:
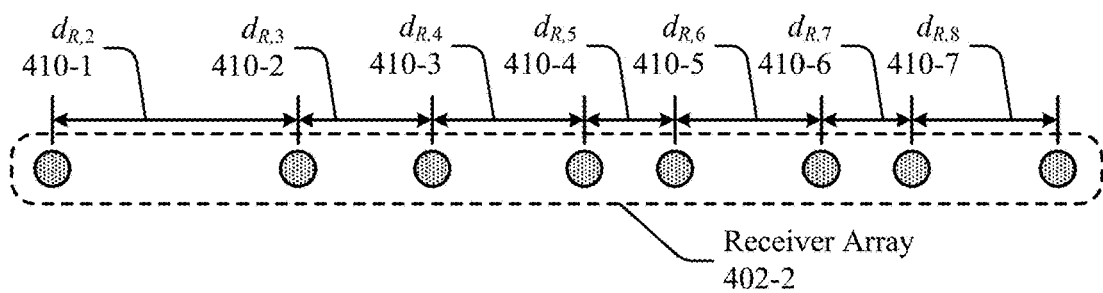
Figures 3, 4:
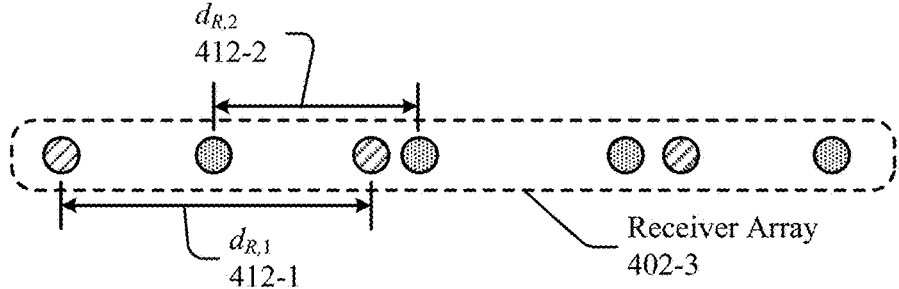
Figure 4:
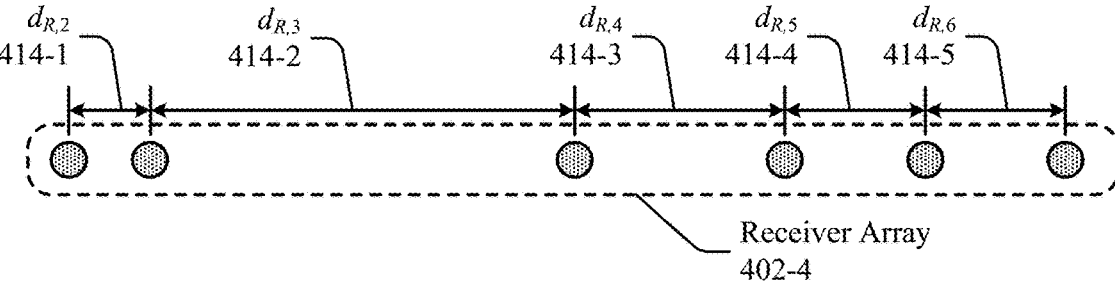

FIG. 3 illustrates an example antenna 300 with a physical array of antenna elements 306 for a radar system that can jointly detect DoA and DoD angles in multipath scenarios. For example, the radar system can be the radar system 102 of FIGS. 1 and 2. In the depicted implementation, the antenna 300 includes a transmitter array 302 and a receiver array 304 that can correspond to the transmitter 106 and the receiver 108, respectively, of FIG. 1.

The transmitter array 302 is a sparse uniform linear array (ULA) that includes $N_T$ antenna elements 306 with a transmitter spacing, $d_T$, 308 among the antenna elements 306. In this document, a sparse array has a spacing among antenna elements 306 that is greater than half the wavelength of the transmitted EM radiation (e.g., dT>0.5λ). In the depicted implementation, the transmitter array 302 includes five antenna elements 306 (e.g., $N_T$ is equal to five). The transmitter array 302 can also include additional or fewer antenna elements 306 in other implementations.

The receiver array 304 is a sparse array that does not have angle ambiguity (e.g., no grating lobes) within a 180 degree or negative-ninety-degree-to-ninety-degree (e.g., [−90°, 90°]) field-of-view. The receiver array 304 includes $N_R$ antenna elements 306 with a receiver spacing, $d_{R,i_R}$, 310, where $i_R=2, \ldots, N_R$ and $d_{R,i_R}$ denotes the spacing between the $(i_R-1)$th antenna element 306 and the $i_R$th antenna element 306. In the depicted implementation, the receiver array 304 includes seven antenna elements 306 (e.g., $N_R$ is equal to seven). The receiver array 304 can also include additional or fewer antenna elements 306 in other implementations.

The transmitter spacing, $d_T$, 308 and the receiver spacing, $d_{R,i_R}$, 310 are multiples of 0.5λ, where λ is the wavelength of the transmitted EM radiation. The transmitter spacing 308 and the receiver spacing 310 can be represented using Equations (1) and (2):

$$d_T = m_T \times 0.5\lambda \qquad (1)$$

$$d_{R,i_R} = m_{R,i_R} \times 0.5\lambda \qquad (2)$$

where $m_T \in \mathbb{Z}^+$ and $m_{R,i_R} \in \mathbb{Z}^+$. For the described radar system, $m_T$ and $m_{R,i_R}$ satisfy one of the following requirements: (1) $m_T$ is equal to one; (2) at least one receiver antenna index $i_R$ has a receiver spacing 310 equal to one (e.g., $m_{R,i_R}=1$); or (3) at least one pair of receiver antenna indices ($i_R$, $j_R$) and one pair of integers (P, Q) satisfies Equation (3):

$$\left| P m_{R,i_R} - Q m_{R,j_R} \right| = 1 \qquad (3)$$

where $i_R=2, \ldots, N_R$, $j_R=2, \ldots, N_R$, $i_R \neq j_R$, $P \in \mathbb{Z}^+$ and $Q \in \mathbb{Z}^+$. In other implementations, the receiver array 304 is the sparse ULA and the transmitter array 302 is the sparse array that does not have angle ambiguity.

The antenna 300 supports a MIMO radar system and can match the radar returns to the corresponding signals. In other implementations, the radar system can operate as a traditional radar system that does not rely on dynamic MIMO techniques.

In the depicted implementations, the transmitter array 302 and the receiver array 304 are positioned in an azimuth direction. In other implementations, the transmitter array 302 and/or the receiver array 304 can be positioned in an elevation direction or another direction.

The transmitter array 302 and the receiver array 304 can be planar arrays that provide high gain and low loss. Planar arrays are well-suited for vehicle integration due to their small size. For example, the antenna elements 306 can be slots etched or otherwise formed in a plating material of one PCB surface for a substrate-integrated waveguide (SIW) antenna. The antenna elements 306 can also be part of an aperture antenna, a microstrip antenna, or a dipole antenna. For example, transmitter array 302 and receiver array 304 can include subarrays of patch elements (e.g., microstrip patch antenna subarrays) or dipole elements.

FIGS. 4-1 through 4-4 illustrate example receiver arrays 402 with sparse arrays of antenna elements without angular ambiguity for a radar system that can jointly detect DoA and DoD angles in multipath scenarios. For example, the radar system can be the radar system 102 of FIGS. 1 and 2. In the depicted implementation, the receiver arrays 402 are examples of the receiver array 304 of FIG. 3.

In FIG. 4-1, the receiver array 402-1 provides a paired staggered array as the sparse array without angular ambiguity. In this design, the receiver array 402-1 includes a sparse uniform linear array of antenna elements 404-1 (e.g., with hatch filling) with a spacing, $d_{R,3}$, 406 (e.g., 2.5λ). The receiver array 402-1 also includes a copy of the uniform linear array composed of antenna elements 404-2 (e.g., with dot filling) with the same spacing, $d_{R,3}$, 406 (e.g., 2.5λ). The second or copy uniform linear array is offset from the first uniform linear array by the spacing, $d_{R,2}$, 408 (e.g., 1.0λ).

In FIG. 4-2, the receiver array 402-2 provides a non-uniform sparse array that satisfies Equation (3) above as the sparse array without angular ambiguity. The depicted receiver array 402-2 includes eight antenna elements with the $m_{R,i_R}$ of the receiver spacing 410-1 (e.g., $d_{R,2}$), 410-2 (e.g., $d_{R,3}$), 410-3 (e.g., $d_{R,4}$), 410-4 (e.g., $d_{R,5}$), 410-5 (e.g., $d_{R,6}$), 410-6 (e.g., $d_{R,7}$), and 410-7 (e.g., $d_{R,8}$) being equal to 8 (e.g., 4.0λ), 4 (e.g., 2.0λ), 5 (e.g., 2.5λ), 2 (e.g., 1.0λ), 6 (e.g., 3.0λ), 3 (e.g., 1.5λ), and 7 (e.g., 3.5λ), respectively. In this design and as an example, the receiver spacing 410-3 (e.g., $m_{R,4}=5$) and 410-2 (e.g., $m_{R,3}=4$) satisfy Equation (3), with P and Q both equal to one.

In FIG. 4-3, the receiver array 402-3 provides a coprime array as the sparse array without angular ambiguity. In this design, the receiver array 402-3 includes two sparse uniform linear arrays of antenna elements with a first spacing, $d_{R,1}$, 412-1 and a second spacing, $d_{R,2}$, 412-2. The first and second spacings, $d_R$, 412 can each be represented by Equation (4), which is similar to Equation (1):

$$d_R = m_R \times 0.5\lambda \qquad (4)$$

The first subarray includes N antenna elements and the value of $m_{R,1}$ for the first spacing, $d_{R,1}$, 412-1 is M, where M and N are positive integers. The second subarray includes 2M antenna elements and the value of $m_{R,2}$ for the second spacing, $d_{R,2}$, 412-2 is N. The integers M and N are coprime (e.g., M and N do not have common factors other than one). As one example, M and N can be equal to five and three, respectively.

In FIG. 4-4, the receiver array 402-4 provides a sparse minimum redundancy array as the sparse array without angular ambiguity. Minimum redundancy arrays achieve maximum aperture resolution for a particular number of antenna elements by reducing the number of redundant spacings present among the antenna elements. For example, the depicted receiver array 402-4 includes six antenna elements with the $m_{R,i_R}$ of the receiver spacing 414-1 (e.g., $d_{R,2}$), 414-2 (e.g., $d_{R,3}$), 414-3 (e.g., $d_{R,4}$), 414-4 (e.g., $d_{R,5}$), and 414-5 (e.g., $d_{R,6}$) equal to 1 (e.g., 0.5λ), 5 (e.g., 2.5λ), 3 (e.g., 1.5λ), 2 (e.g., 1.0λ), and 2 (e.g., 1.0λ), respectively. Other examples of a sparse minimum redundancy array are provided in Table 1 below for different numbers, N, of antenna elements with the receiver spacing provided in terms of $m_{R,i_R}$ as used in Equation (2) above. For sparse minimum redundancy arrays with 5, 6, 7, 8, or 10 antenna elements, Table 1 provides multiple example arrays with the first one or two examples being "restricted" examples where the spatial-frequency spectrum is uniformly covered up to a spacing $m_{MAX}$, which is also the distance between the end antenna elements of the array. The other examples included in Table 1 provide "general" examples of minimum redundancy arrays where the length of the array may be greater than the spacing $m_{MAX}$ and the remaining spacings are not all redundant beyond the $m_{MAX}$ spacing.

TABLE 1

| Examples of minimum redundancy arrays | | |
| --- | --- | --- |
| N | Receiver Spacing ($m_{R,i}$) | $m_{MAX}$ |
| 3 | [1, 2] | 4 |
| 4 | [1, 3, 2] | 6 |
| 5 | [1, 3, 3, 2] | 9 |
| | [4, 1, 2, 6] | 9 |
| 6 | [1, 5, 3, 2, 2] | 13 |
| | [6, 1, 2, 2, 8] | 13 |
| 7 | [1, 3, 6, 2, 3, 2] | 17 |
| | [14, 1, 3, 6, 2, 5] | 18 |
| 8 | [1, 1, 9, 4, 3, 3, 2] | 23 |
| | [1, 3, 6, 6, 2, 3, 2] | 23 |
| | [8, 10, 1, 3, 2, 7, 8] | 24 |
| 9 | [1, 3, 6, 6, 6, 2, 3, 2] | 29 |
| 10 | [1, 2, 3, 7, 7, 7, 4, 4, 1] | 36 |
| | [16, 1, 11, 8, 6, 4, 3, 2, 22] | 37 |

FIG. 5 illustrates an example flowchart 500 of the described techniques and systems for jointly detecting DoA and DoD angles in multipath scenarios. The radar system of

US 12,560,695 B2

11

FIG. 5 can, for example, be the radar system 102 of FIG. 1, which includes the angle-finding module 114. The radar system 102 includes the transmitter array 302 with $N_T$ antenna elements 306 spaced apart by the transmitter spacing, $d_T$, 308. The radar system 102 also includes the receiver array 304 with $N_R$ antenna elements 306 spaced apart by the receiver spacing, $d_{R,i_R}$, 310. The total number of channels in the radar data includes $N_T N_R$ channels.

At 502, the angle-finding module 114 reshapes the beam vector of the radar data into a 2D data matrix (e.g., the 2D data matrix 600 of FIG. 6). In particular, the angle-finding module 114 or processor 110 receives the radar data as an $N_T N_R \times 1$ beam vector. The angle-finding module 114 reshapes this beam vector into an $N_T \times N_R$ complex matrix, X. The element on the rth row and cth column of X can be denoted as $x_{r,c}$, the rth row of X as $X_{r,:}$, and the cth column of X as $X_{:,c}$. The angle-finding module 114 can use the horizontal dimension of the 2D data matrix to measure the DoA angular phase using a sparse array without angular ambiguity and with the receiver spacing, $d_{R,i_R}$, 310. The angle-finding module 114 can also use the vertical dimension of the 2D data matrix to measure the DoD angular phase using a ULA with the transmitter spacing, $d_T$, 308.

At 504, the angle-finding module 114 performs 1D angular phase estimation on the vertical (or DoD) dimension to estimate the DoD phase. The vector, $X_{:,c}$ represents all transmitter data from the cth receiver element. Since there are $N_R$ receiver antenna elements, the processor 110 has $N_R$ snapshots of transmitter array measurements, $X=[X_{:,1} X_{:,2} \ldots X_{:,N_R}]$. The sparse uniform linear array of the transmitter array provides robust angular discrimination in multiple-target scenarios with efficient computations.

Because the transmitter array 304 is a uniform linear array, the angle-finding module 114 can perform the DoD angular phase estimation using at least one of several 1D angular phase estimation algorithms, including a 1D Estimation of Signal Parameters via Rotational Invariance Technique (ESPRIT), a 1D Multiple Signal Classification (MUSIC), a 1D minimum variance distortionless response (MVDR) beamforming technique, or a 1D fast Fourier transform (FFT) beamforming based-function. The angle-finding module 114 can use other 1D angular phase estimation methods as well.

If the angle-finding module 114 uses an FFT approach, the processing includes applying a 1D FFT to each column of matrix X and generating $N_R$ FFT spectrums FFT{X}= [FFT{$X_{:,1}$} FFT{$X_{:,2}$} ... FFT{$X_{:,N_R}$}]. Non-coherent integration (NCI) is then applied to these $N_R$ FFT spectrums by NCI{FFT{X}}=|FFT{$X_{:,1}$}|+|FFT{$X_{:,2}$}|+ . . . +|FFT{$X_{:,N_R}$}|. The angle-finding module 114 then identifies the peaks in the NCI spectrum NCI{FFT{X}}. The angular phase corresponding to these peaks represent the DoD angular phase of the targets.

If the angle-finding module 114 uses a super resolution method (e.g., MVDR, MUSIC, ESPRIT) as the 1D angular phase estimator, the processing includes calculating the covariance matrix $R_X$ from the measurement snapshots X by $R_X=XX^H$. The covariance matrix $R_X$ is input to the respective super resolution method and the processing steps of that method are performed. The output estimated phases are the DoD angular phase of the targets.

The DoD angular phase can be represented as µ and the DoA angular phase as ν. If the radar system 102 detects multiple angular targets, the angle-finding module 114 can represent the joint DoD and DoA phase estimates of the ith

12 target as ($\mu_i$, $\nu_i$), where $-\pi \le \mu_i \le \pi$ and $-\pi \le \nu_i \le \pi$. The angle-finding module 114 can also represent the DoD as θ and the DoA as φ.

The angle-finding module 114 can estimate or determine the number of targets or objects using model order selection methods. For example, the angle-finding module 114 can estimate the number of objects using the Akaike Information Criterion (AIC) and the Minimum Description Length (MDL).

For the DoD estimation, the angle-finding module 114 estimates the angle using the transmitter spacing 308, $d_T$. Consider that the transmitter spacing 308 is equal to $m_T \times 0.5\lambda$. If $m_T$ is equal to one, the angle estimation can cover −90° to 90° without aliasing. The transmitter spacing can be larger than $0.5\lambda$ to improve the angular resolution. In such a case, the DoD estimation θ can include several possible angles. The angle-finding module 114 can estimate the angular phase µ and then calculate the angle θ using Equation (5):

$$\theta = \sin^{-1} \frac{(\mu + 2k\pi)\lambda}{2\pi d_T}, \text{ where } k \in \mathbb{Z} \text{ and } d_T = m_T \times 0.5\lambda \quad (5)$$

When $m_T$ is equal to one, there is one solution for θ between −90° to 90°. When $m_T$ is greater than or equal to two, there are $m_T$ candidate solutions for θ between −90° to 90°.

At 506, the angle-finding module 114 beamforms the transmitter array to the estimated DoD angular phases and estimates the receiver-array vector. The beamforming process extracts the DoA measurement associated with a corresponding DoD angular phase estimate in one radar wave propagation path. For the ith target, the estimated DoD angular phase is $\mu_i$, i=1, 2, . . . , L. At the corresponding angle, the steering vector for the transmitter array is given by Equation (6):

$$a_T^{(i)} = \begin{bmatrix} 0 & e^{-j\mu_i} & e^{-j2\mu_i} & \ldots & e^{-j(N_T-2)\mu_i} & e^{-j(N_T-1)\mu_i} \end{bmatrix}^T \quad (6)$$

where $a_T^{(i)}$ is a $N_T \times 1$ complex vector.

Considering all L targets, the steering matrix for the transmitter array is given by Equation (7):

$$A_T = \begin{bmatrix} a_T^{(1)} & a_T^{(2)} & \ldots & a_T^{(L)} \end{bmatrix} \quad (7)$$

where $A_T$ is a $N_T \times L$ complex matrix.

The receiver-array vector for the ith target can be estimated by beamforming the transmitter array to the DoD phase estimate of the ith target as represented in Equation (8):

$$x_R^{(i)} = \left(a_T^{(i)}\right)^H X \quad (8)$$

where $x_R^{(i)}$ is a $1 \times N_R$ complex vector.

To write the beamforming for all L targets in matrix computation form, the receiver-array vector is represented by Equation (9):

$$X_R = \begin{bmatrix} x_R^{(1)} \\ x_R^{(2)} \\ \vdots \\ x_R^{(L)} \end{bmatrix} \tag{9}$$

The angle-finding module 114 estimates the receiver-array vector using Equation (10):

$$X_R = (A_T)^H X \tag{10}$$

where $X_R$ is an $L \times N_R$ complex matrix. The ith row of $X_R$ is the receiver-array vector for the ith target whose DoD phase estimation is $\mu_i$.

For scenarios where a high signal-to-noise ratio is present, the angle-finding module 114 can obtain a more accurate estimation of the receiver-array vector $X_R$ by solving the signal model as represented in Equation (11):

$$X = A_T X_R + N \tag{11}$$

where N is a $N_T \times N_R$ complex matrix representing noise.

The angle-finding module 114 can solve Equation (11) using a least square solution approach, which solution is represented in Equation (12):

$$X_R = \left( (A_T)^H A_T \right)^{-1} (A_T)^H X \tag{12}$$

At 508, the angle-finding module 114 performs 1D angular phase estimation on the horizontal (or DoA) dimension to estimate the DoA phase using the receiver-array vector. The receiver array, which is the sparse array without angular ambiguity, provides de-aliasing capability for DoA angles across the field of view between −90° and 90°. The vector $x_R^{(i)}$ represents the receiver-array vector for the ith target whose DoD phase estimation is $\mu_i$. The angle-finding module 114 applies a 1D FFT to the vector $x_R^{(i)}$ to generate an FFT spectrum. Because the spacing of the receiver array is an integer multiple of half the wavelength, the angle-finding module 114 can substitute a zero value to completely fill out the vector for FFT processing. The angle corresponding to the maximum peak in this FFT spectrum is the DoA angle of the ith target. The estimated DoA angle is denoted as $\phi_i$, where −90°≤$\phi_i$<90°.

At 510, the angle-finding module 114 calculates a matching error between the DoD and DoA angular phase estimates. The matching error between the DoD and DoA angles from one radar wave propagation path indicates if the corresponding propagation path is a monostatic or bistatic reflection scenario. For the ith target, the mathematical relationship between the DoD angle $\theta_i$ and its DoD phase estimate $\mu_i$ is represented by Equation (13):

$$\mu_i + 2k\pi = \frac{2\pi d_T \sin \theta_i}{\lambda}, \text{ where } k \in \mathbb{Z} \tag{13}$$

If the ith target is from a monostatic reflection path, the DoD angle $\theta_i$ should be equal to or approximately equal to the DoA angle $\phi_i$. As a result, Equation (13) can be rewritten as Equation (14):

$$\mu_i + 2k\pi = \frac{2\pi d_T \sin \phi_i}{\lambda}, \text{ where } k \in \mathbb{Z} \tag{14}$$

Considering noise and measurement variations, the angle-finding module 114 can relax the criterion in Equation (14) to the criterion provided by Equation (15):

$$\mu_i + 2k\pi \cong \frac{2\pi d_T \sin \phi_i}{\lambda}, \text{ where } k \in \mathbb{Z} \tag{15}$$

Based on this criterion in Equation (15), the angle-finding module 114 can identify a bistatic reflection scenario using the following algorithm. For the ith target, the angle-finding module 114 calculates $$v_i = \frac{2\pi d_T \sin \phi_i}{\lambda} - 2k\pi,$$

where $k \in \mathbb{Z}$, such that $-\pi \leq v_i \leq \pi$. The angle-finding module 114 then calculates the matching error as the circular distance between $\mu_i$ and $v_i$ using Equation (16):

$$\text{Matching\_Error}_i = \min(|\mu_i - v_i|, 2\pi - |\mu_i - v_i|) \tag{16}$$

If the Matching_Error$_i \leq \varepsilon$, where $\varepsilon$ is a tolerance value (e.g., 0.3), then the angle-finding module 114 can identify the ith target as being from a monostatic reflection scenario, output the DoA angle $\phi_i$, and set a bistatic flag as false (e.g., flag 'f_bistatic=false'). Other systems and components (e.g., tracking system, fusion system) of the vehicle 104 can use the bistatic flag for characterizing the environment surrounding the vehicle 104 based on the radar detections. The tolerance value is a predetermined value set between 0 and 1 determined from empirical analysis and depends on the layout or design of the transmitter array and receiver array. In general, as the total aperture of the transmitter array and receiver array increases, the corresponding tolerance value decreases. In other words, the tolerance value is generally inversely related to a total combined aperture of the receiver array and the transmitter array. If the Matching_Error$_i > \varepsilon$, then the angle-finding module 114 can identify the ith target as being from a bistatic reflection scenario, output the DoA angle $\phi_i$, and set the bistatic flag as true (e.g., flag 'f_bistatic=true'). The angle-finding module 114 can repeat the above processing for each detected target. For monostatic reflection scenarios, the matching error also represents an indicator of the precision of the DoA angle.

The described techniques and systems of the angle-finding module 114 allow the radar system 102 to jointly determine DoA and DoD angles in multipath scenarios where both bistatic and monostatic reflection scenarios may exist. The angle estimates corresponding to the one or more objects 120 can be determined without aliasing and with a single data snapshot. In addition, the radar system 102 can use sparse transmitter and receiver arrays (e.g., spacing of antenna elements greater than 0.5λ) to increase the aperture of the arrays without additional antenna elements.

FIG. 6 illustrates an example 2D data matrix 600 generated by the described radar system to jointly detect DoA and DoD angles in multipath scenarios. The data matrix 600 is generated as part of operation 502 of the angle-finding module 114 as described with respect to FIG. 5.

Consider that the radar system 102 includes $N_T$ antenna elements 306 in a transmitter array and $N_R$ antenna elements 306 in a receiver array. The radar system 102 then includes $N_T N_R$ channels. Generally, radar system 102 receives the radar data as low-level, time-series data in a $N_T N_R \times 1$ beam vector obtained from the antenna arrays, where the quantity of rows is equal to a product of the quantity of antenna elements in the transmitter array and the quantity of antenna elements in the receiver array. The angle-finding module 114 can reshape the radar data into the 2D data matrix 600 as a $N_T \times N_R$ complex matrix X.

In the 2D data matrix 600, the radar data of the ith row 606 is data from the ith transmitter antenna element. Similarly, the radar data of the jth column 608 is data from the jth receiver antenna element. The 2D data matrix 600 includes rows 606-1, 606-2, 606-3, . . . , and 606-$N_T$ and columns 608-1, 608-2, 608-3, . . . , 608-($N_R$–1), and 608-$N_R$. For example, the first row 606-1 is data from the first transmitter antenna element and the second column 608-2 is data from the second receiver antenna element. Mathematically, the horizontal dimension of the 2D data matrix 600 measures the DoA angular phase using a sparse array of $N_R$ antenna elements with antenna spacing, $d_{R,j}$, 602 (e.g., receiver spacings 602-2 ($d_{R,2}$), 602-3 ($d_{R,3}$), . . . , and 602-$N_R$ ($d_{R,N_R}$)), and the vertical dimension measures the DoD angular phase using a sparse ULA with an antenna spacing, $d_T$, 604.

Example Method

FIG. 7 illustrates an example method 700 of the radar system 102 to jointly detect DoA and DoD angles in multipath scenarios, including both monostatic reflection scenarios, bistatic reflection scenarios, or a combination of both. Method 700 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1, and entities detailed in FIGS. 1 through 6, reference to which is made for example only. The techniques are not limited to performance by one entity or multiple entities.

At 702, a radar system transmits EM energy using a transmitter array having a first quantity of antenna elements. For example, the transmitter array 302 of the antenna 300 can include six antenna elements 306. The antenna elements 306 are spaced apart by the transmitter spacing, $d_T$, 308. In this example, the transmitter array 302 is a sparse uniform linear array.

At 704, the radar system receives EM energy reflected by one or more objects using a receiver array having a second quantity of antenna elements. For example, the receiver array 304 of the antenna 300 can include eight antenna elements 306. The adjacent pairs of antenna elements 306 are spaced apart by the receiver spacing, $d_{R,j_R}$, 310. The EM energy transmitted by the transmitter array 302 can be reflected by one or more objects 120. In this example, the receiver array 304 is a sparse array without angle ambiguity within a field-of-view between –90° and 90°. In other examples, the receiver array 304 can be a sparse uniform linear array and the transmitter array 302 can be a sparse array without angle ambiguity.

At 706, the radar system generates a 2D data matrix using the EM energy received at the receiver array. The 2D data matrix includes the first quantity of rows and the second quantity of columns. For example, the angle-finding module 114 can use the EM energy received at the receiver array 304 to generate the 2D data matrix 600 from a beam vector. The 2D data matrix 600 can include six rows and eight columns corresponding to the quantity of antenna elements in the transmitter array 302 and the receiver array 304, respectively.

At 708, the radar system determines DoA angle estimates and DoD angle estimates for monostatic reflection conditions and/or bistatic reflection conditions using the 2D data matrix. For example, the angle-finding module 114 can use the 2D data matrix 600 to perform the flowchart 500 to determine DoA angle estimates and DoD angle estimates for monostatic reflection conditions and/or bistatic reflection conditions as explained in greater detail with respect to FIG. 5.

At 710, the radar system determines an angle associated with each of the one or more objects by comparing the DoA angle estimates to the DoD angle estimates. For example, the angle-finding module 114 can compare the DoA angle estimates to the DoD angle estimates to determine an azimuth or elevation angle for the one or more objects that reflected the EM energy as explained in greater detail with respect to FIG. 5.

EXAMPLES

In the following section, examples are provided.

Example 1: A radar system comprising: a transmitter array configured to transmit electromagnetic (EM) energy, the transmitter array having a first quantity of antenna elements; a receiver array configured to receive EM energy reflected by one or more objects, the receiver array having a second quantity of antenna elements, a first array of the transmitter array or the receiver array being a sparse uniform linear array, a second array of the transmitter array or the receiver array being a sparse array without angle ambiguity within a field-of-view of the second array, the second array being different than the first array; and one or more processors configured to: generate, using the EM energy received at the receiver array, a two-dimensional (2D) data matrix, the 2D data matrix having the first quantity of rows and the second quantity of columns; determine, using the second quantity of columns of the 2D data matrix, DoD angular phase estimates corresponding to the one or more objects; beamform, for each object of the one or more objects, the transmitter array to a corresponding DoD angular phase estimate of the DoD angular phase estimates and estimate a corresponding receiver-array vector; determine, using the corresponding receiver-array vector, a DoA angular phase estimate and DoA angle estimate corresponding to each object of the one or more objects; determine, for each object of the one or more objects, a matching error between the DoD angular phase estimate and the DoA angular phase estimate; and for each object of the one or more objects and in response to the matching error being larger than a tolerance value, determine that a bistatic reflection condition exists and output the DoA angle estimate as a DoA angle for the corresponding object, the bistatic reflection condition corresponding to the DoA angular phase estimate not being approximately equal to the DoD angular phase estimate; or for each object of the one or more objects and in response to the matching error not being larger than the tolerance value, determine that a monostatic reflection condition exists and output the DoA angle estimate as the DoA angle for the corresponding object, the monostatic reflection condition corresponding to the DoD angular phase estimate being approximately equal to the DoA angular phase estimate.

Example 2: The radar system of Example 1, wherein: a spacing between antenna elements of the first array is equal to one half a wavelength of the EM energy ($\lambda$/2); at least one spacing between adjacent antenna elements of the second array is equal to one half the wavelength of the EM energy ($\lambda$/2); or a pair of spacings between adjacent antenna elements of the second array satisfies: $Pm_{R,i_R}-Qm_{R,j_R}=1$, where P and Q are positive integers, $m_{R,i_R}$ is a first spacing between adjacent antenna elements of the second array, $m_{R,j_R}$ is a second spacing between adjacent antenna elements, the first spacing and the second spacing each being an integer multiple of one half the wavelength of the EM energy ($\lambda$/2).

Example 3: The radar system of Example 1 or 2, wherein: the transmitter array is the first array with uniform spacing among adjacent antenna elements; and the receiver array is the second array having non-uniform spacing among pairs of adjacent antenna elements.

Example 4: The radar system of Example 3, wherein the uniform spacing and the non-uniform spacing are integer multiples of one half a wavelength of the EM energy ($\lambda$/2).

Example 5: The radar system of Example 4, wherein the receiver array is one of a paired staggered array, a coprime array, or a minimum redundancy array.

Example 6: The radar system of any one of the preceding Examples, wherein the one or more processors are configured to generate the 2D data matrix by reshaping a beam vector into the 2D data matrix, the beam vector having a quantity of rows equal to a product of the first quantity and the second quantity.

Example 7: The radar system of any one of the preceding Examples, wherein: a horizontal dimension of the 2D data matrix indicates a direction-of-arrival (DoA) angular phase for the one or more objects; and a vertical dimension of the 2D data matrix indicates a direction-of-departure (DoD) angular phase for the one or more objects.

Example 8: The radar system of any one of the preceding Examples, wherein the one or more processors are configured to determine the DoD angular phase estimates corresponding to the one or more objects using at least one of a one-dimensional (1D) Estimation of Signal Parameters via Rotational Invariance Technique (ESPRIT), a ID Multiple Signal Classification (MUSIC) technique, a 1D minimum variance distortionless response (MVDR) beamforming technique, or a 1D fast Fourier transform (FFT) beamforming based-function.

Example 9: The radar system of any one of the preceding Examples, wherein the one or more processors are further configured to determine a quantity of the one or more objects that reflected the EM energy.

Example 10: The radar system of any one of the preceding Examples, wherein the one or more processors are further configured to: in response to the matching error being larger than the tolerance value, set a bistatic reflection flag as true; and in response to the matching error not being larger than the tolerance value, set the bistatic reflection flag as false.

Example 11: The radar system of any one of the preceding Examples, wherein the tolerance value is equal to a predetermined value between 0 and 1, the predetermined value being set based on designs of the transmitter array and the receiver array.

Example 12: The radar system of Example 11, wherein the tolerance value is inversely related to a total combined aperture of the receiver array and the transmitter array.

Example 13: The radar system of any one of the preceding Examples, wherein: the transmitter array and the receiver array are positioned in the azimuth direction; the field-of-view of the second array is equal to 180 degrees; and the radar system is configured to be installed on an automobile.

Example 14: A method comprising: transmitting, through a transmitter array of a radar system, electromagnetic (EM) energy, the transmitter array having a first quantity of antenna elements; receiving, from a receiver array of the radar system, EM energy reflected by one or more objects, the receiver array having a second quantity of antenna elements, a first array of the transmitter array or the receiver array being a sparse uniform linear array, a second array of the transmitter array or the receiver array being a sparse array without angle ambiguity within a field-of-view of the second array, the second array being different than the first array; generating, using the EM energy received at the receiver array, a two-dimensional (2D) data matrix, the 2D data matrix having the first quantity of rows and the second quantity of columns; determining, using the second quantity of columns of the 2D data matrix, DoD angular phase estimates corresponding to the one or more objects; beamforming, for each object of the one or more objects, the transmitter array to a corresponding DoD angular phase estimate of the DoD angular phase estimates and estimate a corresponding receiver-array vector; determining, using the corresponding receiver-array vector, a DoA angular phase estimate and DoA angle estimate corresponding to each object of the one or more objects; determining, for each object of the one or more objects, a matching error between the DoD angular phase estimate and the DoA angular phase estimate; and for each object of the one or more objects and in response to the matching error being larger than a tolerance value, determining that a bistatic reflection condition exists and outputting the DoA angle estimate as a DoA angle for the corresponding object, the bistatic reflection condition corresponding to the DoA angular phase estimate not being approximately equal to the DoD angular phase estimate; or for each object of the one or more objects and in response to the matching error not being larger than the tolerance value, determining that a monostatic reflection condition exists and outputting the DoA angle estimate as the DoA angle for the corresponding object, the monostatic reflection condition corresponding to the DoD angular phase estimate being approximately equal to the DoA angular phase estimate.

Example 15: A computer-readable storage media comprising computer-executable instructions that, when executed, cause a processor of a radar system to perform the method of Example 14.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:

1. A radar system comprising:
   a transmitter array configured to transmit electromagnetic (EM) energy, the transmitter array having a first quantity of antenna elements;
   a receiver array configured to receive EM energy reflected by one or more objects, the receiver array having a second quantity of antenna elements, the transmitter array being a sparse uniform linear array, the receiver array being a sparse array without angle ambiguity within a field-of-view of the receiver array, and the receiver array being different than the transmitter array; and one or more processors configured to:

generate, using the EM energy received at the receiver array, a two-dimensional (2D) data matrix, the 2D data matrix having the first quantity of rows and the second quantity of columns, a horizontal dimension of the 2D data matrix corresponding to a direction of arrival (DoA) angular phase for the one or more objects and a vertical dimension of the 2D data matrix corresponding to a direction-of-departure (DoD) angular phase for the one or more objects;

determine, by performing one-dimensional (1D) angular phase estimation on the vertical dimension of the 2D data matrix, a DoD angular phase estimate and a DOD angle estimate corresponding to each object of the one or more objects;

beamform, for each object of the one or more objects, the transmitter array to a corresponding DoD angular phase estimate of the DoD angular phase estimates and estimate a corresponding receiver-array vector by extracting a DoA measurement associated with a corresponding DoD angular phase estimate in one radar wave propagation path;

determine, by performing 1D angular phase estimation on the horizontal dimension of the 2D data matrix using the corresponding receiver-array vector, a DoA angular phase estimate and a DoA angle estimate corresponding to each object of the one or more objects;

determine, for each object of the one or more objects, a matching error between the corresponding DoD angular phase estimate and the corresponding DoA angular phase estimate;

for each object of the one or more objects, and in response to the matching error being larger than a tolerance value, determine that a bistatic reflection condition exists and output the DoA angle estimate as a DoA angle for the corresponding object, the bistatic reflection condition corresponding to the DoA angular phase estimate not being approximately equal to the DoD angular phase estimate; and for each object of the one or more objects and in response to the matching error not being larger than the tolerance value, determine that a monostatic reflection condition exists and output the DoA angle estimate as the DoA angle for the corresponding object, the monostatic reflection condition corresponding to the DoD angular phase estimate being approximately equal to the DoA angular phase estimate.

2. The radar system of claim 1, wherein:
a spacing between antenna elements of the transmitter array is greater than one half a wavelength of the EM energy ($\lambda/2$);
at least one spacing between adjacent antenna elements of the receiver array is equal to one half the wavelength of the EM energy ($\lambda/2$); or
a pair of spacings between adjacent antenna elements of the receiver array satisfies:

$$|Pm_{R,i_R} - Qm_{R,j_R}| = 1,$$

20 where P and Q are positive integers, $m_{R,i_R}$ is a first spacing between adjacent antenna elements of the receiver array, $m_{R,j_R}$ is a second spacing between adjacent antenna elements of the receiver array, the first spacing and the second spacing each being an integer multiple of one half the wavelength of the EM energy ($\lambda/2$).

3. The radar system of claim 1, wherein:
the transmitter array has uniform spacing among adjacent antenna elements; and
the receiver array has non-uniform spacing among pairs of adjacent antenna elements.

4. The radar system of claim 3, wherein the uniform spacing and the non-uniform spacing are integer multiples of one half a wavelength of the EM energy ($\lambda/2$).

5. The radar system of claim 4, wherein the receiver array is one of a paired staggered array, a coprime array, or a minimum redundancy array.

6. The radar system of claim 1, wherein the one or more processors are configured to generate the 2D data matrix by reshaping a beam vector into the 2D data matrix, the beam vector having a quantity of rows equal to a product of the first quantity and the second quantity.

7. The radar system of claim 1, wherein the one or more processors are configured to determine the DoD angular phase estimates corresponding to the one or more objects using at least one of a one-dimensional (1D) Estimation of Signal Parameters via Rotational Invariance Technique (ES-PRIT), a 1D Multiple Signal Classification (MUSIC) technique, a 1D minimum variance distortionless response (MVDR) beamforming technique, or a 1D fast Fourier transform (FFT) beamforming based-function.

8. The radar system of claim 1, wherein the one or more processors are further configured to determine a quantity of the one or more objects that reflected the EM energy.

9. The radar system of claim 1, wherein the one or more processors are further configured to:
in response to the matching error being larger than the tolerance value, set a bistatic reflection flag as true; and
in response to the matching error not being larger than the tolerance value, set the bistatic reflection flag as false.

10. The radar system of claim 1, wherein the tolerance value is equal to a predetermined value between 0 and 1, the predetermined value being set based on designs of the transmitter array and the receiver array.

11. The radar system of claim 10, wherein the tolerance value is inversely related to a total combined aperture of the receiver array and the transmitter array.

12. The radar system of claim 1, wherein the transmitter array and the receiver array are positioned in the azimuth direction.

13. The radar system of claim 1, wherein the field-of-view of the receiver array is equal to 180 degrees.

14. The radar system of claim 1, wherein the radar system is configured to be installed on an automobile.

15. A non-transitory computer-readable storage media comprising computer-executable instructions that, when executed, cause a processor of a radar system to:
transmit, through a transmitter array of the radar system, electromagnetic (EM) energy, the transmitter array having a first quantity of antenna elements;
receive, from a receiver array of the radar system, EM energy reflected by one or more objects, the receiver array having a second quantity of antenna elements, the transmitter array being a sparse uniform linear array, the receiver array being a sparse array without angle ambiguity within a field-of-view of the second array, and the receiver array being different than the transmitter array;

generate, using the EM energy received at the receiver array, a two-dimensional (2D) data matrix, the 2D data matrix having the first quantity of rows and the second quantity of columns, a horizontal dimension of the 2D data matrix corresponding to a direction of arrival (DoA) angular phase for the one or more objects and a vertical dimension of the 2D data matrix corresponding to a direction-of-departure (DoD) angular phase for the one or more objects;

determine, by performing one-dimensional (1D) angular phase estimation on the vertical dimension of the 2D data matrix, a DoD angular phase estimate and a DoD angle estimate corresponding to each object of the one or more objects;

beamform, for each object of the one or more objects, the transmitter array to a corresponding DoD angular phase estimate of the DoD angular phase estimates and estimate a corresponding receiver-array vector by extracting a DoA measurement associated with a corresponding DoD angular phase estimate in one radar wave propagation path;

determine, by performing 1 D angular phase estimation on the horizontal dimension of the 2D data matrix using the corresponding receiver-array vector, a DoA angular phase estimate and a DoA angle estimate corresponding to each object of the one or more objects;

determine, for each object of the one or more objects, a matching error between the corresponding DoD angular phase estimate and the corresponding DoA angular phase estimate;

for each object of the one or more objects and in response to the matching error being larger than a tolerance value, determine that a bistatic reflection condition exists and output the DoA angle estimate as a DoA angle for the corresponding object, the bistatic reflection condition corresponding to the DoA angular phase estimate not being approximately equal to the DoD angular phase estimate; and for each object of the one or more objects and in response to the matching error not being larger than the tolerance value, determine that a monostatic reflection condition exists and output the DoA angle estimate as the DoA angle for the corresponding object, the monostatic reflection condition corresponding to the DoD angular phase estimate being approximately equal to the DoA angular phase estimate.

16. The non-transitory computer-readable storage media of claim 15, wherein:

a spacing between antenna elements of the transmitter array is greater than one half a wavelength of the EM energy ($\lambda$/2);

at least one spacing between adjacent antenna elements of the receiver array is equal to one half the wavelength of the EM energy ($\lambda$/2); or a pair of spacings between adjacent antenna elements of the receiver array satisfies:

$$|Pm_{R,i_R} - Qm_{R,j_R}| = 1,$$

where P and Q are positive integers, $m_{R,i_R}$ is a first spacing between adjacent antenna elements of the receiver array, $m_{R,j_R}$ is a second spacing between adjacent antenna elements of the receiver array, the first spacing and the second spacing each being an integer multiple of one half the wavelength of the EM energy ($\lambda$/2).

17. The non-transitory computer-readable storage media of claim 15, wherein:

the transmitter array has uniform spacing among adjacent antenna elements; and the receiver array has non-uniform spacing among pairs of adjacent antenna elements, the receiver array being one of a paired staggered array, a coprime array, or a minimum redundancy array, the uniform spacing and the non-uniform spacing being integer multiples of one half a wavelength of the EM energy ($\lambda$/2).

18. The non-transitory computer-readable storage media of claim 15, wherein the instructions, when executed, further cause the processor of the radar system to:

in response to the matching error being larger than the tolerance value, set a bistatic reflection flag as true; and in response to the matching error not being larger than the tolerance value, set the bistatic reflection flag as false.

19. A method comprising:

transmitting, through a transmitter array of a radar system, electromagnetic (EM) energy, the transmitter array having a first quantity of antenna elements;

receiving, from a receiver array of the radar system, EM energy reflected by one or more objects, the receiver array having a second quantity of antenna elements, the transmitter array being a sparse uniform linear array, the receiver array being a sparse array without angle ambiguity within a field-of-view of the receiver array, and the receiver array being different than the transmitter array;

generating, using the EM energy received at the receiver array, a two-dimensional (2D) data matrix, the 2D data matrix having the first quantity of rows and the second quantity of columns, a horizontal dimension of the 2D data matrix corresponding to a direction of arrival (DoA) angular phase for the one or more objects, and a vertical dimension of the 2D data matrix corresponding to a direction-of-departure (DoD) angular phase for the one or more objects;

determining, by performing one-dimensional (1D) angular phase estimation on the vertical dimension of the 2D data matrix, a DoD angular phase estimate and a DoD angle estimate corresponding to each object of the one or more objects;

beamforming, for each object of the one or more objects, the transmitter array to a corresponding DoD angular phase estimate of the DoD angular phase estimates and estimate a corresponding receiver-array vector by extracting a DoA measurement associated with a corresponding DoD angular phase estimate in one radar wave propagation path;

determining, by performing 1D angular phase estimation on the horizontal dimension of the 2D data matrix, using the corresponding receiver-array vector, a DoA angular phase estimate and a DoA angle estimate corresponding to each object of the one or more objects;

determining, for each object of the one or more objects, a matching error between the corresponding DoD angular phase estimate and the corresponding DoA angular phase estimate;

for each object of the one or more objects and in response to the matching error being larger than a tolerance value, determining that a bistatic reflection condition exists and outputting the DoA angle estimate as a DoA angle for the corresponding object, the bistatic reflection condition corresponding to the DoA angular phase estimate not being approximately equal to the DoD angular phase estimate; and for each object of the one or more objects and in response to the matching error not being larger than the tolerance value, determining that a monostatic reflection condition exists and outputting the DoA angle estimate as the DoA angle for the corresponding object, the monostatic reflection condition corresponding to the DoD angular phase estimate being approximately equal to the DoA angular phase estimate.

* * * * *